United States Patent [19]

Womack

[11] 4,225,273
[45] Sep. 30, 1980

[54] APPARATUS FOR THREADING RODS

[75] Inventor: Robert C. Womack, Dallas, Tex.

[73] Assignee: AAA Products International Inc., Dallas, Tex.

[21] Appl. No.: 907,504

[22] Filed: May 19, 1978

Related U.S. Application Data

[63] Continuation-in-part of Ser. No. 841,665, Oct. 13, 1977, abandoned.

[51] Int. Cl.³ .......................... B23G 1/00; B23Q 5/22; B23G 11/00
[52] U.S. Cl. .................................... 408/12; 10/89 R; 10/105; 408/62; 408/69
[58] Field of Search ............... 10/89 R, 89 P, 89 WH, 10/107 PH, 129 WH, 139 WH, 105; 408/12, 14, 62, 69, 70, 63

[56] References Cited

U.S. PATENT DOCUMENTS

| | | | |
|---|---|---|---|
| Re. 23,684 | 7/1953 | Benninghoff et al. | 408/12 |
| 1,154,010 | 9/1915 | Grunbauch | 10/89 R |
| 1,444,109 | 2/1923 | Clay | 10/89 R |
| 2,116,639 | 5/1938 | Protin | 10/89 R |
| 2,224,691 | 12/1940 | Pealer | 10/89 R |
| 2,318,177 | 5/1943 | Mathias | 408/12 |
| 2,376,164 | 5/1945 | Miller et al. | 10/105 |
| 2,403,484 | 7/1946 | Ashworth | 408/62 |
| 2,490,841 | 12/1949 | Smith | 408/8 |
| 2,551,517 | 5/1951 | Webb | 408/8 |
| 2,576,114 | 11/1951 | Hibbard | 10/105 |
| 4,087,875 | 5/1978 | Lacy | 10/11 R |
| 4,122,572 | 10/1978 | Pauls | 10/105 |

Primary Examiner—Ervin M. Combs
Attorney, Agent, or Firm—Peter J. Murphy

[57] ABSTRACT

A hollow drive spindle is rotatably mounted on a base and carries a self-opening threading die; and the spindle is driven by a suitable electric drive motor. An air operated collet chuck is mounted on a carriage, for reciprocating the chuck in longitudinal alignment with the threading die. The apparatus is semi-automatic in operation including an electric control circuit and actuator mechanisms operated in response to movement of the carriage. When the carriage reaches its rear limit position the chuck is opened to release the rod and the threading die is closed. When a rod is inserted in the chuck at the beginning of a cycle, it engages a stop arm so that further forward force on a rod also moves the carriage toward the die. With initial forward movement of the carriage, the chuck is closed on the rod and the stop arm is moved out of interference position. Further forward movement of the rod and carriage engages the rod with the threading die; and an adjustable actuator is tripped, at the selected limit of forward carriage movement, to open the threading die permitting withdrawal of the carriage and rod. A pair of forward limit actuator mechanisms, connected alternately in the control circuit, allow for the threading of two different lengths of thread on opposite ends of a rod.

Alternatively, the threading head may be a tap or a non-opening threading die. The control circuit provides for automatic reversal of the threading head drive motor when the desired length of thread is cut.

26 Claims, 13 Drawing Figures

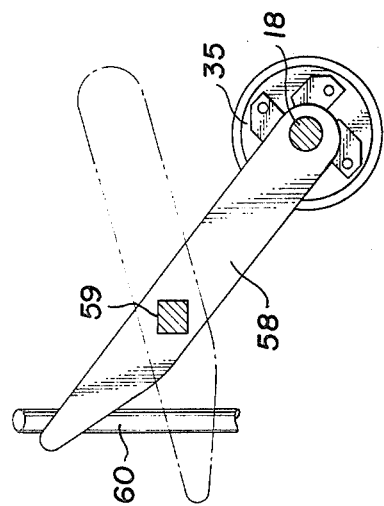
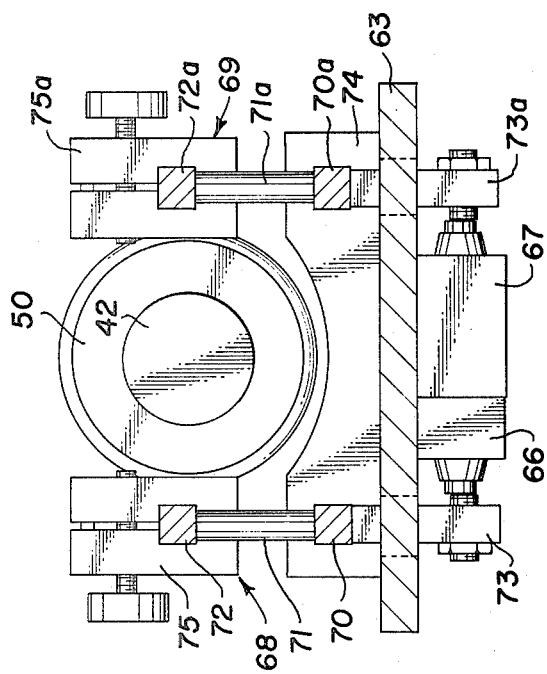
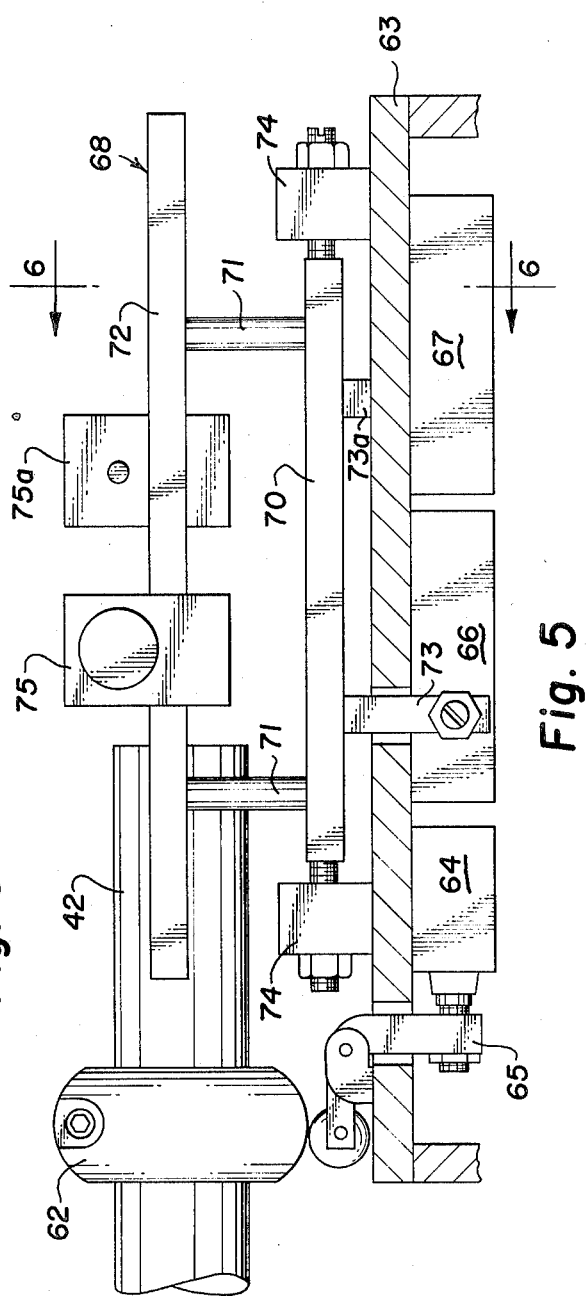

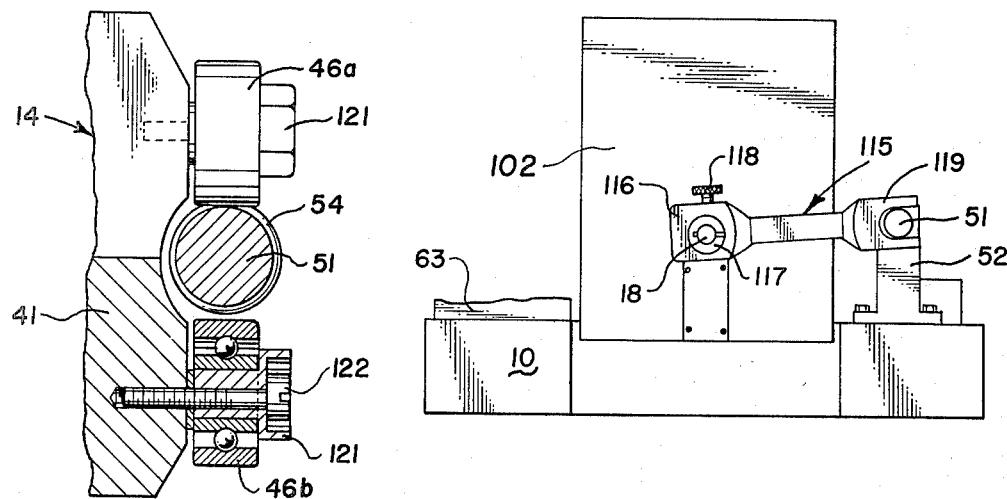
Fig. 10
Fig. 12
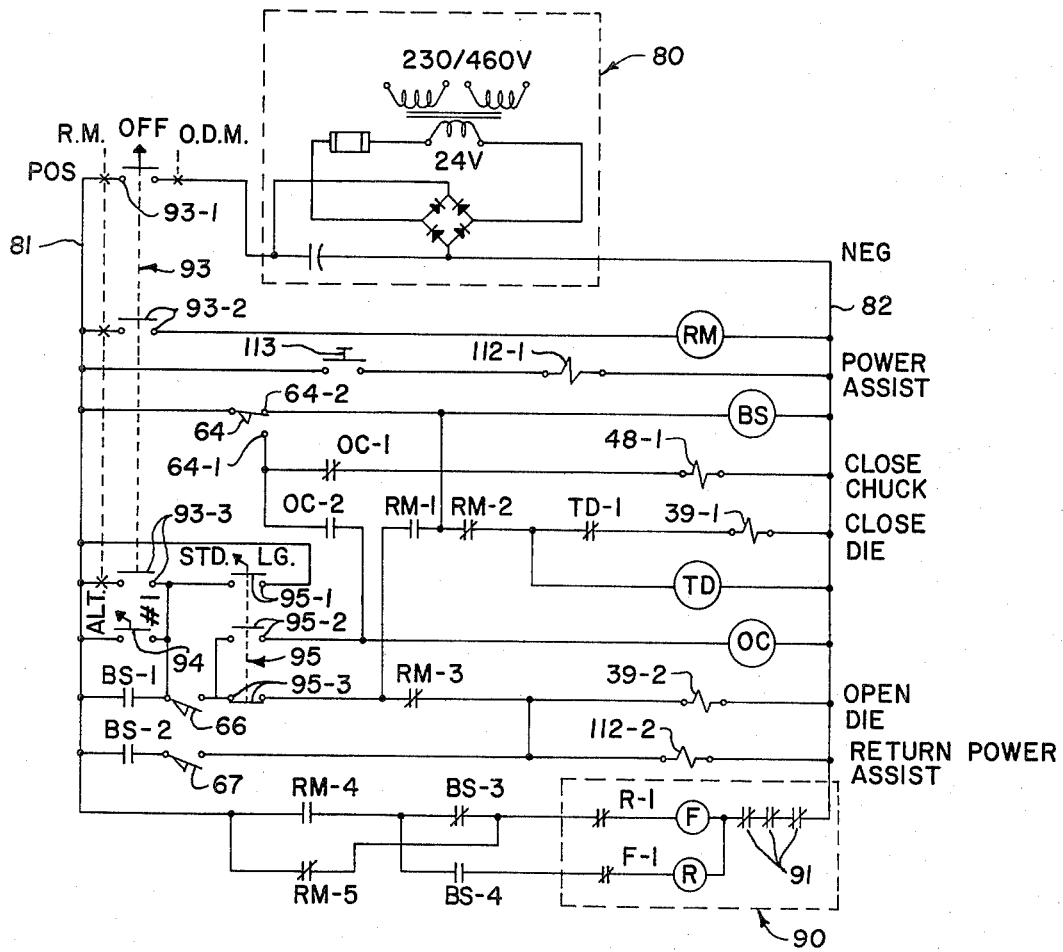
Fig. 13

APPARATUS FOR THREADING RODS

REFERENCE TO RELATED APPLICATION

This is a continuation-in-part of application Ser. No. 841,665, filed Oct. 13, 1977, entitled ROD THREADING MACHINE, abandoned.

BACKGROUND AND SUMMARY OF THE INVENTION

This invention relates to apparatus for threading the ends of a rod, or like member, either externally or internally; and more particularly to such apparatus which is semi-automatic in operation.

Machines which are conventionally used for the cutting of external threads on the ends of rods are turret lathes. Such machines are very expensive from the standpoint of equipment investment, and are expensive machines to operate from the standpoint of the labor time required to insert and remove work pieces and that a highly skilled machinist is required for the operation of such machines. Such machines are inefficient for threading a production run of rods because they are not geared to high speed production, and they are also limited to the threading of a single length of thread without time consuming and expensive setup changes. For the cutting of threads on a rod in a production run, whether it be a long production run or a short production run, it is desirable to provide a threading machine which is capable of high speed operation and which is adapted to be operated by semiskilled personnel. Since threaded rods may require different lengths of thread on the opposite ends thereof, it is desirable to provide a rod threading machine which is capable of threading, sequentially, both ends of the rod, and which is automatic in this regard so that time consuming setup is not required.

A principal object of this invention is to provide apparatus for threading the ends of rods, which apparatus is semi-automatic in operation enabling fast and accurate threading operation by unskilled personnel.

Another object of this invention is to provide such apparatus wherein the only steps by the operator include inserting a rod into the chuck, moving the rod and chuck forward into engagement with the threading head, and withdrawing the rod after the threading is completed.

A further object of this invention is to provide such apparatus which is simple to use, and enables the precise threading of a selected length of threads on a rod with minimal opportunity for error.

Still another object of this invention is to provide such apparatus which is compact in design and portable in the sense that it can be readily mounted or supported on any suitable support frame or table.

A still further object of this invention is to provide such apparatus which is portable and self-contained, thereby readily moved to different work locations and set up for immediate use.

Another object of this invention is to provide such apparatus which can be set up to cut different lengths of threads on opposite ends of a rod, in alternating apparatus cycles.

Another object of this invention is to provide such apparatus wherein the length of threads to be cut can be set very precisely; and where the length of threads to be cut can be changed very easily and quickly.

Another object of this invention is to provide such apparatus for the cutting of long threads on a rod in multiple increments, and for cutting of a full length thread on a rod.

These objects are accomplished broadly in threading apparatus which comprises the following components mounted on a support base. A hollow drive spindle is mounted for rotation on the base, and a threading head is nonrotatably mounted on the drive spindle in axial alignment therewith. Drive means is provided for rotating the drive spindle in at least one direction. A carriage is mounted on the base for forward and rearward reciprocating movement in a direction parallel to the rotational axis of the threading head. Stop means limits the rearward movement of the carriage away from the threading head, and defines a rear limit position for the carriage. A collet chuck is mounted on the carriage disposed in axial alignment with the threaded head; and the carriage and collet chuck are configured to enable a rod to be passed through the chuck. Actuator means are mounted on the base for controlling selected functions of a threading cycle of the apparatus; and trip means is mounted on the carriage for activating the actuator means in response to selected movements of the carriage.

More particularly the apparatus may include a self-opening and closing threading head, a self-opening and closing collet chuck, and/or an automatically reversing drive means for the spindle; and the actuator means are provided for controlling selected functions after the carriage moves a selected distance toward the threading head, and upon return of the carriage to the rear limit position.

The novel features and the advantages of the invention, as well as additional objects thereof, will be understood more fully from the following description when read in connection with the accompanying drawings.

DRAWINGS

FIG. 4 is a sectional view taken in the plane 4—4 of FIG. 2 illustrating the relation of the stop arm and stop arm cam to the threading head;

FIG. 5 is a fragmentary detail view, taken along the line 5—5 of FIG. 2 illustrating the limit switch operating mechanisms;

FIG. 6 is a sectional detail view taken in the plane 6—6 of FIG. 6;

FIG. 10 is a sectional view taken along the line 10—10 of FIG. 9, particularly illustrating the carriage guide rollers;

FIG. 12 is a rear end view of the apparatus of FIGS. 9 and 11, particularly illustrating the anti-rotation rod clamp; and FIG. 13 is a schematic control circuit diagram for the apparatus of FIGS. 9 through 12, incorporating the control circuit illustrated in FIG. 8.

EMBODIMENT OF FIGS. 1 THROUGH 8

Figure 1:
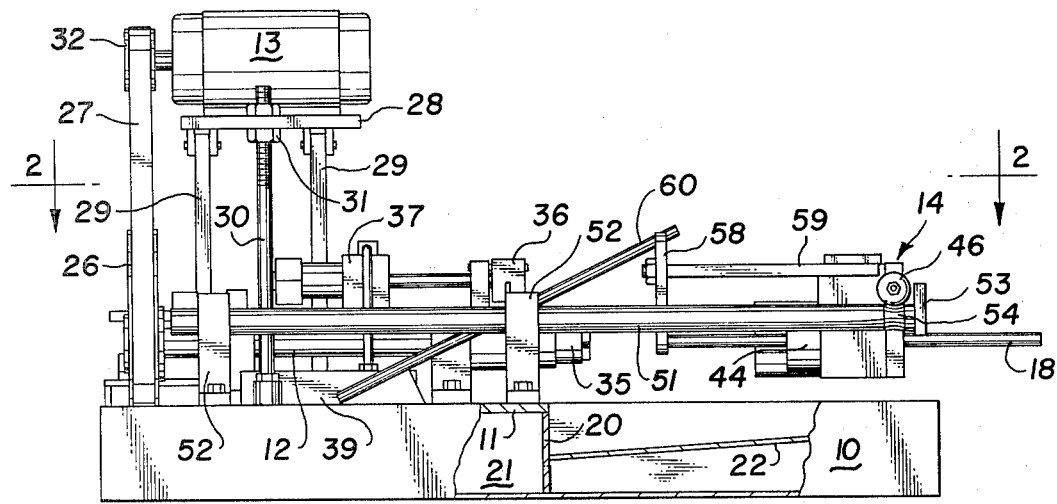
FIG. 1 is a side elevation view of a preferred form of apparatus according to the invention.
Figure 3:
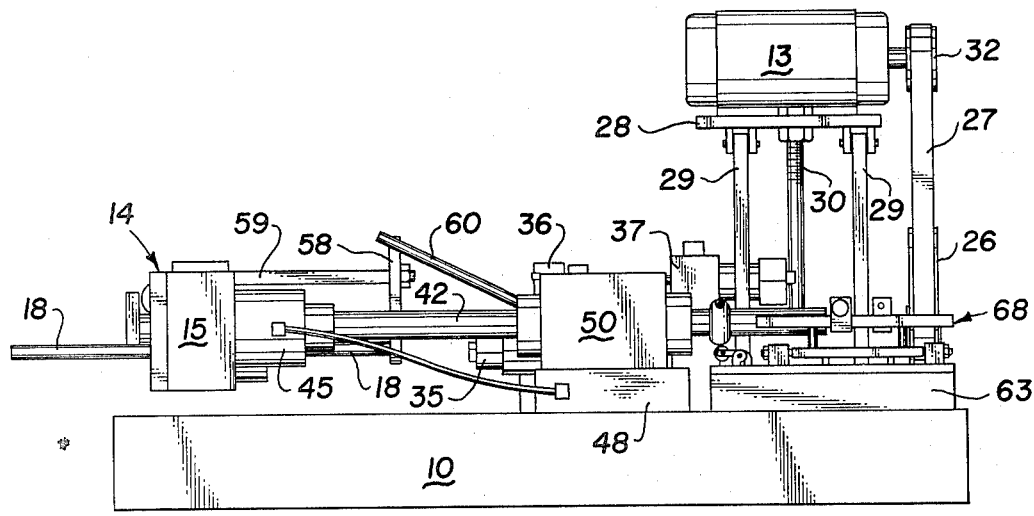
FIG. 3 is a side elevation view of the apparatus of FIG. 1 from the opposite side.
Figure 2:
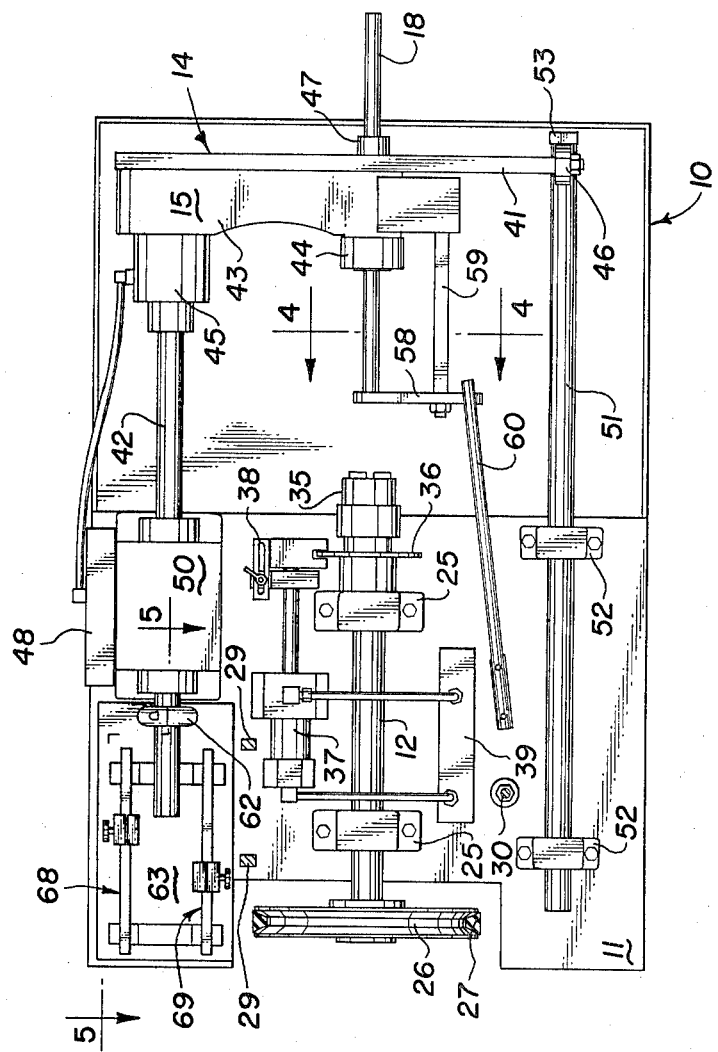
FIG. 2 is a top view of the apparatus of FIG. 1, taken in the plane 2—2 of FIG. 1 to eliminate the showing of the motor and its mounting.

One preferred form of apparatus according to the invention, illustrated in FIGS. 1 through 8, is a portable form, in the sense that the apparatus may be mounted or supported on a suitable support table or platform. The basic components for the apparatus include: a base 10, in the form of a rectangular vessel for collecting and providing a reservoir for cooling oil or other cooling fluid; a base plate 11 which is secured to and overlies one end portion of the base 10; a drive spindle 12 rotatably supported on the base plate 11 and carrying a threading head; an electric drive motor 13 mounted on an adjustable support structure supported above the base plate 11; a carriage 14 guided and supported for forward and rearward reciprocating movement relative to the base plate 11; an air operated, self-closing collet chuck assembly 15 mounted on the carriage to support and guide a rod 18 into operative relation with the threading head; and associated control mechisms and circuitry for semi-automatic operation of the apparatus.

Two forms of threading heads will be described; one form being a self-opening die for cutting external threads, and the other form being a tap for cutting internal threads. Two modes of operation will be described: namely, the "opening-die mode" and the "reversing mode". For the opening-die mode, the drive motor 13 is operated in one direction only, with the self-opening die serving to cut an external thread of selected length on the end of a rod, with the die then opening to permit withdrawal of the rod from the die. For the reversing mode, the threading head may be either the above mentioned tap or a split-round threading die, both of which require a reversible motor since it will be necessary to reverse the motor to back the tap or die off the threads which have been cut. The apparatus to be described, and its control circuit are adapted for both modes of operation.

Referring now to the drawings in detail, the motor 13 is mounted at what is referred to for convenience as the forward or front end of the apparatus; and the carriage 14 is at the rear end of the apparatus. As will be seen, the operator of the apparatus will position himself at the rear, and references to the left and right sides of the apparatus are from the vantage point of the operator. The base 10 is a rectangular vessel fabricated from sheet metal for example, and includes a transverse wall 20 which separates a reservoir 21 at its forward end from a collection ramp 22 at its rearward end. The ramp 22 is inclined to allow drainage of cooling fluid toward the reservoir; and the wall 20 includes suitable screened ports to allow return of the cooling fluid to the reservoir. A suitable circulation pump may be mounted in the reservoir for delivering cooling fluid to the cutting head through a delivery conduit. The base plate 11 is a relatively heavy gauge metal plate overlying and secured to the reservoir portion of the base 10.

The drive spindle 12 is a hollow shaft generally coextensive with the front to rear length of the base plate 11, and supported for rotation on the base plate by ball bearing pillow blocks 25. The spindle overhangs the base plate at the forward end and carries a driven pulley 26 for a toothed drive belt 27 for example. The support for the drive motor 13 includes a support platform 28 pivotally attached to a pair of support legs 29 mounted on the base plate 11 adjacent to the right side. The platform 28 is further supported by a third support leg 30 mounted on the base plate adjacent to its left side, and having a threaded upper end which passes through a slot in the support platform. Nuts 31 threaded on the third leg confine the platform and adjust the height of the platform relative to the base plate 11 to accommodate different size pulleys and control tension on the drive belt 27. A drive pulley 32 carried on the motor shaft overhangs the support platform 28 and is aligned above the driven pulley 26 for driving engagement with the belt 27.

A preferred form of threading head is a self-opening die head 35, for cutting external threads on the rod 18 or other work piece. This self-opening die is nonrotatably mounted at the rear end of the drive spindle 12, and includes an axially shiftable control collar which shifts the head between stable "open" and "closed" conditions. The collar includes an annular groove to receive a semicircular control yoke 36. The collar is reciprocated by means of a double-acting air cylinder motor 37, which carries the control yoke 36 at the end of an extensible shaft. The control yoke is pivotable at the end of the shaft to allow changing and/or removal of the die head 35; and an adjustable dog 38 prevents pivoting disengagement of the yoke from the die head groove during the operation of the apparatus.

In order to minimize wear of the control yoke 36 and the mating groove of the die head collar, the air cylinder motor 37 is operated by a spring-centered four way valve 39 which includes two solenoids 39-1 and 39-2 for shifting the valve in opposite directions from the center position. In the center position of the valve, the ports of the air cylinder motor are vented so that the control yoke 36 maintains no axial force against the walls of the mating collar groove. In operation, the respective solenoids are energized only momentarily to shift the control collar, and the valve returns immediately to the center position.

The carriage 14 includes a transverse frame member 41 disposed at the rear of the apparatus, and a support shaft 42 projecting forwardly perpendicularly from the frame member, at the right side thereof. The shaft 42 is actually mounted on the air operated chuck assembly 15 which includes a housing 43, a self-closing collet chuck 44, and an air cylinder 45 for shifting the chuck between the open and closed conditions. The carriage frame 41 carries a roller 46 at its left end to support the left side of the carriage on a support rail to be described.

The support shaft may be a one inch round hardened steel shaft, which is supported and guided in an elongated linear ball bushing 50 mounted on the base plate 11 at the right side. This ball bushing serves as the principal support for the carriage and has sufficient length to precisely align and guide the carriage 14 in its reciprocating movements toward and from the threading head. The longitudinal axis of the ball bushing is parallel to the rotational axis of the drive spindle 12. An elongated support rail 51 is mounted on the base plate at the left side by means of suitable clamp brackets 52. The longitudinal axis of the support rail 51 is also aligned parallel with the rotational axis of the spindle 12. The carriage roller 46 is mounted on a transverse axis to roll along the top of the support rail 51, to provide the left side support for the carriage 14; and an upright stop 53 is fixed to the rear end of the support rail to limit rearward movement of the carriage. This stop 53 defines the rear limit position of the carriage 14. A recess 54 is provided in the top surface of the rail adjacent to its rear end, and is configured to allow the support roller 46 to be received slightly within the recess to provide a slight restraint to initial forward movement of the carriage from the rear limit position. With the above described carriage support, the carriage moves very freely; and the function of this restraining recess 54 will be described subsequently.

The collet chuck assembly 44 is designed so that the rods to be threaded may be passed into the chuck from the rear of the carriage through an aligned hole in the carriage frame member 41. For the purpose of guiding precisely rods of different size into the chuck, removable guide bushings 47 are mountable on the rear face of the carriage frame 41.

The collet air cylinder 45 is controlled by a four-way valve 48 mounted on the base plate 11; and is preferably an axially shiftable spool valve, spring biased to one operative position and shifted by means of a solenoid to the second operative position. The valve is spring biased to the "open chuck" position wherein the air cylinder shifts open the chuck; and when the valve solenoid is energized the valve shifts to the "close chuck" position.

As will be described, the operation of the apparatus is semi-automatic and is actually controlled by the action of the operator inserting a rod 18 into the chuck, pushing forward on the rod to effect forward movement of the carriage to engage the rod with the threading head, and pulling on the rod to withdraw the carriage and remove the rod after the threading operation is completed. To accomplish the forward movement of the carriage, one end of the rod is inserted through the collet chuck 44 from the rear of the carriage until it engages a stop which prevents further movement of the rod relative to the carriage until the chuck is closed.

The rod stop is a transverse arm 58 which is pivotally mounted at the forward end of a support bracket 59 extending forwardly from the collet chuck housing. This arm pivots about an axis parallel with the chuck axis and, in the rear limit position of the carriage, the arm is positioned in the path of the leading end of a rod 18 which is passed through the chuck. The stop arm is maintained in this interference position by an elongated cam rod 60, which is mounted on the base plate 11 and projects upwardly and rearwardly toward the carriage. As the carriage 14 is moved forwardly from the rear limit position, the stop arm 58 is rotated out of the interference position and in a manner to clear the threading head 35 as the carriage is moved forward to the rod threading position. Retraction of the carriage to the rear limit position again positions the stop arm 58 in the interference position. The restraint provided by the coaction of the carriage roller 46 and recess 54, assures that the rod 18 engages the stop arm 58 before the carriage moves away from the rear limit position.

The actuator mechanisms, which coact with the control circuit to control the machine functions, will now be described. The actuator trip member is a collar cam 62, which is adjustably clamped on the carriage shaft 42 forward of the ball bushing 50. This collar cam coacts with an actuator mechanism for a rear limit switch, and with actuator bar mechanisms for two forward limit switches. As best seen in FIGS. 5 and 6, these limit switches and associated mechanisms are mounted on a support plate 63, which is mounted on the base plate 11. The limit switches to be described are push button limit switches, spring biased to one condition. A rear limit switch 64 is mounted at the rearward end of the support plate; and is operated by a bell crank 65 pivotally mounted at the top of the support plate and having a downwardly projecting leg which engages the limit switch pushbutton. The transverse leg of the bell crank carries a roller which is engaged by the collar cam 62 of the support shaft in the rear limit position of the carriage. In that rear limit position, the rear limit switch 64 opens the solenoid circuit of the chuck valve 48 to effect the opening of the collet chuck. The chuck is maintained in open condition, then, only when the carriage 14 is in the rear limit position.

A first forward limit switch 66 and a second forward limit switch 67 are also mounted on the under surface of the support plate; and identical actuator bar mechanisms 68 and 69 are provided for operating these switches, one of which will be described in detail. The operator bar mechanism 68 for the first forward limit switch 66 is a rigid structure consisting of a horizontal bearing shaft 70, a pair of upright legs 71, a cam support bar 72 supported at the upper ends of said legs, and a downwardly extending trip arm 73. The bearing shaft is pivotally supported by end bearings 74 mounted on the control plate 63; and the trip arm 73 extends downward through a hole in the support plate to engage the pushbutton of the limit switch 66. An adjustable clamp cam 75 is selectively positionable along the cam support bar. The pivot axis defined by the end bearings 74 is precisely parallel with the direction of travel of the support shaft 42; and similarly the cam support bar is parallel to the support shaft.

The support bars are maintained in position that the clamp cams 75 supported thereon function as follower cams to be engaged by the collar cam 62 to close the respective forward limit switches. The clamp cams are movable to selected positions along the cam support bars, to select the limits of carriage travel at which respective forward limit switches will be closed. The cam support bars may be provided with suitable linear indicia to provide a reference in relation to the depth of threads cut by the threading head, for the purpose of selecting the position of a clamp cam 75. It will be seen that these actuator bar mechanisms are positioned at opposite sides of the path of the support shaft and collar cam.

Figure 7:
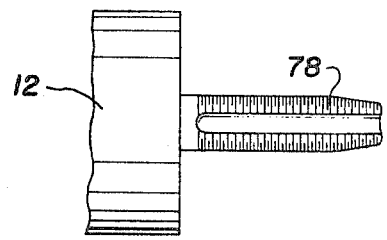
FIG. 7 is a fragmentary top view illustrating a threading tap as the threading head of the apparatus.

Before proceeding with a description of the operation of the apparatus, in connection with the control circuit, reference is made to FIG. 7 which illustrates an alternative form of threading head and is illustrative of the alternative mode of operation which is referred to as the "reversing mode". Here the threading head is a threading tap for cutting internal threads in a bore at the end of a rod 18, for example. For this mode of operation, the air cylinder 37 serves no function and is inoperative; and the motor is reversed to effect a relative backing off of the threading tap. The threading tap, of course, does not move axially; and the "backing off" is effected by a backing off of the carriage in response to the reverse rotation of the tap. This same reversing mode is effective in the event that a nonopening split-round threading die is substituted for the self-opening threading die 35.

Figure 8:
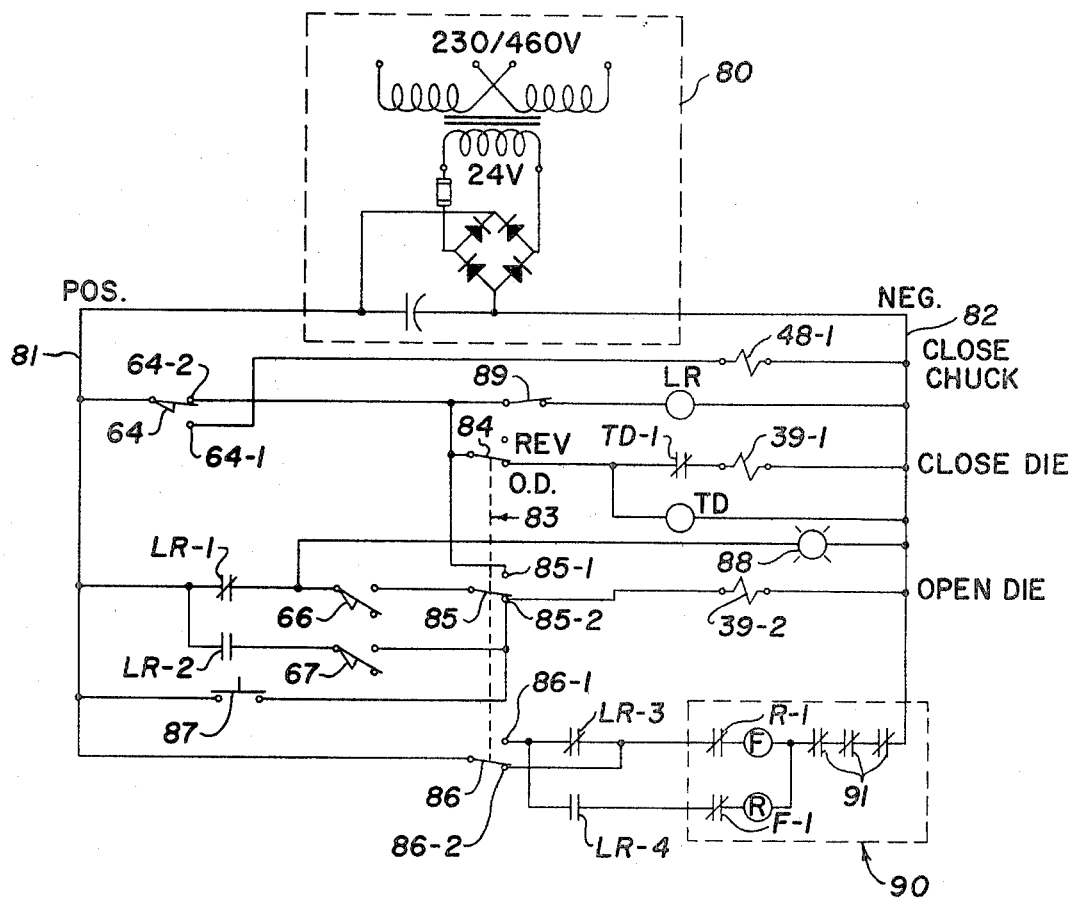
FIG. 8 is a schematic control circuit diagram for the apparatus of FIGS. 1 through 7.

The control circuit for the above described apparatus is illustrated schematically in FIG. 8. A power supply 80, for this circuit, is a DC power supply including a transformer for converting a 230 volt or 460 volt AC line supply to a 24 volt AC output, and includes a rectifier and capacitor for producing a 24 volt DC output. The power supply 80 is connected to positive bus 81 and negative bus 82. This control circuit will control the apparatus for both the opening-die mode of operation and the reversing mode of operation. For the purpose of selecting between modes, the circuit includes a selector switch 83 including three switch arms 84, 85 and 86. In the drawing, the selector switch 83 is positioned for the opening-die mode of operation.

The rear limit switch 64, in its normal position, makes its contact 64-1 to energize the solenoid 48-1 of the chuck control valve. This effects the closing of the collet chuck. In the rear limit position of the carriage, this rear limit switch makes the contact 64-2 to energize a bi-stable latching relay LR.

The valve 39 for controlling the self-opening die includes solenoid coil 39-1 for effecting the closing of the die, and solenoid coil 39-2 for effecting the opening of the die. For the close-die function, a time delay relay TD is connected for energization through the contact 64-2 of the rear limit switch and selector switch arm 84, when the switch 83 is in the opening-die mode position. The valve solenoid 39-1 is connected for energization through the same rear limit switch contact 64-2, the selector switch arm 84, and normally closed contact TD-1 of the time delay relay TD. The valve solenoid 39-2, for effecting the opening of the die, is connected for energization through three separate parallel circuits. The first of these circuits includes the first forward limit switch 66, the normally closed contacts LR-1 of latching relay LR, and the selector switch arm 85 through its contact 85-2. The second circuit includes the second forward limit switch 68 and the normally open contacts LR-2 of the latching relay LR. The third circuit includes simply a manually operated, normally open push button switch 87, for opening the die when desired during servicing of the apparatus for example.

An indicator light 88 is connected for energization through the relay contacts LR-1; and this light indicates when the first forward limit switch 66 is connected to the positive bus 81. The bi-stable latching relay LR, through its contacts LR-1 and LR2, alternately connects either the first or second forward limit switches to the positive bus.

A manual switch 89 may be opened to remove the latching relay LR from the circuit. This switch may be opened when the apparatus is in the opening-die mode and only one thread length is to be cut. For this operation, only one forward limit switch would be used to open the die.

The circuit diagram illustrates a portion of a magnetic starter circuit 90 which would be incorporated in the reversible motor 13, this circuit including forward and reverse relay coils F and R respectively, and forward and reverse interlock contacts F-1 and R-1 which are normally closed. The contact R-1 is opened when the reverse relay R is energized to prevent possible simultaneous energization of the forward relay F; and similarly the relay contact F-1 is opened when the forward relay F is energized to prevent the reverse relay R from being energized simultaneously. Overload cutout contacts 91 are connected in series with both the forward and reverse relays to prevent motor operation in the event of overload conditions.

Referring now to the control circuit connections to the magnetic starter 90, for the opening-die mode, the motor forward relay F is connected to the positive bus 81 through the selector switch arm 86 and its contact 86-2. For this mode the motor will operate in the forward direction only which is, of course, the direction of cutting the thread on a rod.

For the reversing mode the selector switch arm 86 makes its contact 86-1; and the forward relay F is connected to switch contact 86-1 through normally closed relay contacts LR-3, while the reversing relay R is connected to switch contact 86-1 through the normally open relay contacts LR-4. The latching relay LR, then, controls the reversing of the motor between forward drive and reverse drive through its contacts LR-3 and LR-4. For this mode the apparatus will cut only one selected length of thread and the second forward limit switch 88 is not connected in the circuit. The first forward limit switch 86 is connected by means of selector switch arm 85, switch contact 85-1 and switch 89 to energize the relay LR. The circuit control switches and other components may be mounted in and on a combination control box and panel conveniently mounted on the apparatus.

OPERATION

Operating cycles for the apparatus will now be described, first for the opening-die mode of operation and second for the reversing mode of operation.

For the opening-die mode, the selector switch 80 is switched to the illustrated position wherein the contact arms 84, 85, and 86 are making their respective contacts designated 2. At the beginning of an operating cycle, the carriage is at its rear limit position wherein the rear limit switch 64 is making its contact 64-2. Chuck valve solenoid 48-1 is not energized, and chuck 44 is open. The contacts of relay LR are in their respective first conditions which are conditions illustrated in FIG. 8. The die 35 is closed.

Assuming a two-stage cycle operation where a first end of the rod is to be threaded to a first selected depth and a second end of the rod is to be threaded to a second selected depth, the switch 89 is closed to effect the latching relay function. The clamp cams 75, for the respective forward limit switch operator mechanisms, are positioned to select the two different thread depths. It should be observed that the indicator light 88 is lighted to indicate that first forward limit switch 66 is connected to the positive bus.

The operator inserts the first end of the rod 18 into the chuck against the stop arm 58; and further forward force by the operator will move the carriage away from the rear limit position and toward the die. As soon as the carriage moves away from its rear limit position, the rear limit switch makes its contact 64-1 to energize valve solenoid 48-1 to effect the closing of the chuck 44. Continued force on the rod moves the rod and carriage to the die 35, and a threading operation of the die will draw the rod and carriage forward until the first forward limit switch 66 is tripped. This limit switch then effects energization of the open-die solenoid 39-2, which effects opening of the die and stops the thread cutting operation. The rod and carriage are then free to be withdrawn to the rear, which is accomplished by the operator pulling on the rod 18.

When the carriage reaches the rear limit position, the switch contact 64-1 opens deenergizing chuck valve solenoid 48-1 to effect opening of the chuck; and the rod 18 is withdrawn from the chuck by the operator. The rear limit switch 64 again makes its contact 64-2 to energize the relay coil LR, switching the contacts LR-1 and LR-2 to the second condition wherein the second forward limit switch 68 is connected to the positive bus 81. This fact will be indicated by the extinguishing of the indicator light 88.

Simultaneously the close-die solenoid 39-1 is energized through relay contact TD-1 and switch arm 84 and the die is closed for the second stage of the cycle. Also simultaneously the relay coil TD is energized which, after a time delay, opens the contact TD-1 to deenergize the close-die solenoid. This allows the valve 39 to return to its spring centered position and remove the force acting on the die operating yoke 36.

The apparatus is now in condition for the cycle second stage wherein the second end of the rod 18 is inserted into the chuck and the above described cycle is repeated with the second forward limit switch 68 functioning to open the die when the threads are cut on this second end. When the carriage is returned to its rear limit position the machine is conditioned to repeat the above described two-stage cycle with a new rod.

An operating cycle under the reversing mode of operation will now be described. The selector switch 83 is positioned in the alternate position (not illustrated) wherein the respective arms 84, 85 and 86 make the respective contacts designated −2. When the control circuit is energized, the motor is energized for rotation in its forward direction by energization of the forward relay F through the switch arm 86 and contact 86-1, the normally closed contacts LR-3, the normally closed contacts R-1 and the normally closed overload cutouts 91 and 92. The energization of the motor relay F effects the opening of normally closed contacts F-1 so that it is impossible to energize the reverse relay simultaneously, through a control circuit malfunction for example. At the beginning of the cycle the latching relay LR is in condition that its contacts LR-1 and LR-3 are closed and its contacts LR-2 and LR-4 are open; and this condition is indicated by the energization of the indicator light 88 through the contacts LR-1. This also enables the energization of the motor forward relay R as just described. The carriage 15 is in its rear limit position wherein the chuck solenoid 48-1 is deenergized and the chuck is opened. The cycle now described is for the threading of a single end of a rod 18.

The operator inserts the first end of the rod into the chuck against the stop arm 58; and additional forward force by the operator moves the carriage away from the rear limit position toward the threading die. Movement of the carriage away from the rear limit position opens switch contact 64-2, and closes contact 64-1 to energize the chuck valve solenoid 48-1 to effect closing of the chuck. Further forward force on the rod then moves the rod into engagement with the threading head.

When the desired length of threads are cut, the first forward limit switch 66 is closed, and this energizes the latching relay LR to shift the condition of its contacts. The contact LR-3 is opened to deenergize the motor forward relay F, and the contact LR-4 is closed to energize the reverse relay R. The contact R-1 is then opened to prevent energization of the forward relay be circuit malfunction. The motor immediately reverses to effect backing off of the threading head relative to the rod. When the rod is clear of the threading head, the operator, by pulling on the rod, pulls the carriage rearward to the rear limit position; and the carriage upon reaching the rear limit position opens switch contact 64-1 to deenergize the chuck valve solenoid 48-1 and open the chuck to allow withdrawal of the rod by the operator. Simultaneously the rear limit switch contact 64-2 is closed to again energize the latching relay to shift its respective contacts to the condition for the commencement of a succeeding cycle where the motor is again driven in the forward direction.

EMBODIMENT OF FIGS. 9 THROUGH 13

FIGS. 9 through 13 illustrate a modified preferred form of apparatus according to the invention, incorporating additional structural features and enabling the performance of additional functions. In the following description of this modified form the components and elements of the apparatus which are identical to those previously described, are identified by the same reference numbers.

This modified form of apparatus, designated 100, is adapted to handle the cutting of threads on larger rods, up to 2½ inches in diameter for example. For this purpose a heavy duty drive mechanism is required; and this is represented by a drive motor 101 and gear box 102 coacting with a drive gear 103 fixed to the spindle 12. The gear box 102 may include a change speed mechanism for selecting different spindle speeds.

Figure 9:
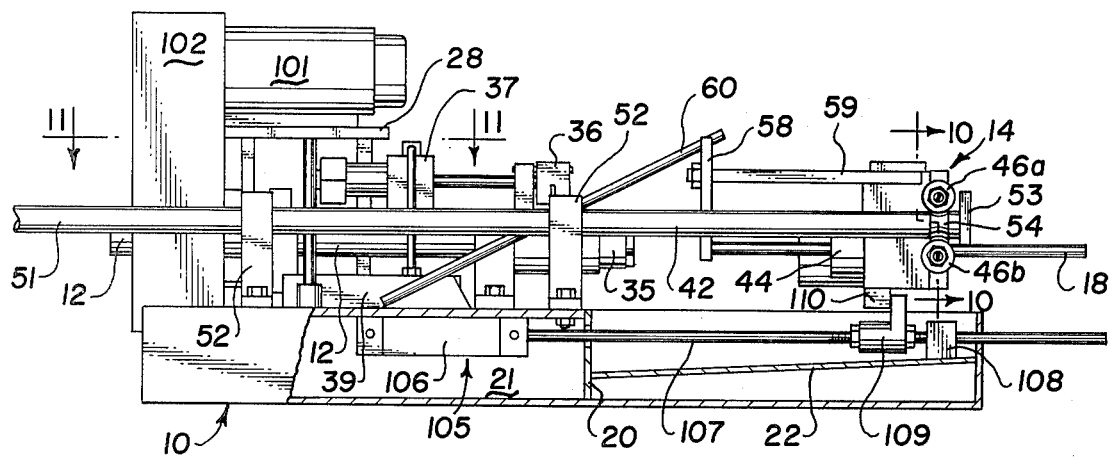
FIG. 9 is a side elevation view of a modified form of apparatus according to the invention.

For the threading of larger diameter rods, there may be a need for a power assist to initiate the engagement of the rod end with the threading die. Such a power assist mechanism 105 is illustrated in FIG. 9, and includes an air cylinder motor 106 mounted on the underside of the base plate 11 directly under the spindle 12. The air cylinder motor includes an actuator pull rod 107 extending rearwardly in parallel relation with the spindle 12, and being slidably supported adjacent its rear end by a guide bushing 108 mounted within the base 10. The pull rod 107 carries a hook 109, adjustably positioned on the pull rod by means of suitable collars for example, and which is disposed for engagement with a catch 110 mounted on the underside of the carriage 14. The hook 109 and catch 110 coact to enable the air cylinder motor 106 to pull the carriage forward. The air cylinder motor 106 requires a stroke sufficient to move the carriage forward from the rear limit position illustrated in FIG. 9 to a forward position sufficient to assist in the cutting of several threads, and then release the carriage to allow the carriage and rod to follow the lead of the die without distorting force from the air cylinder motor. The air cylinder motor 106 is preferably sized to permit several hundred pounds of force to be applied to the carriage; and includes means for controlling the rate of forward feed of the carriage toward the die head 35, and then to apply the force necessary to start the cutting of the threads.

The air cylinder motor 106 is controlled preferably by means of a two-position, four-way solenoid operated valve 112, shown mounted on the plate 11, including operating solenoids 112-1 and 112-2. For shifting the valve to the feed position, the solenoid 112-1 may be energized by an appropriate switch 113; and for shifting the valve to the return condition, the solenoid 112-2 may be energized by an appropriate forward limit switch 66 for example. This control function will be described more fully in connection with the operating circuit. When the desired length of thread is cut, for one cutting cycle, the forward limit switch will be activated effecting return of the hook 109 and enabling the manual return of the carriage 14 to the rear limit position.

The apparatus 100 is also adapted for the cutting of long threads, that is where the desired length of thread to be cut is longer than the feed stroke of the carriage 14. This can be accomplished with the use of a cutting head 35 which permits the threading of the rod to be interrupted, while the head remains in cutting engagement with the rod. Additionally, the apparatus requires a control circuit which provides a "long thread mode" of operation in which the rod is threaded in one or more increments. For the cutting of a 6 inch thread for example, the clamp cam 75 for the operator bar mechanism 68 may be set for a 3 inch cut; and the "long thread mode" of the operating circuit is selected to enable the cutting of two successive 3 inch increments prior to releasing the rod 18 from the cutting head. For the long thread mode of circuit operation, the limit switch 66 for example will be effective to open the chuck 44 when the rod reaches the end of the first increment cut. This will allow the rod 18 to rotate with the cutting head 35 will remaining clamped in the cutting head, and allow the carriage to be returned to the rear limit position. Upon the succeeding movement of the carriage away from the rear limit position, the limit switch 64 will again effect the closing of the chuck 44 to effect the cutting of the second 3 inch increment. During this feed stroke for the second increment, the circuit selector is preferably switched back to the normal mode, so that the actuation of the forward limit switch 66 at the end of this stroke will effect the opening of the die head 35 allowing retraction of the carriage and removal of the rod 18 in the manner described previously.

Figure 11:
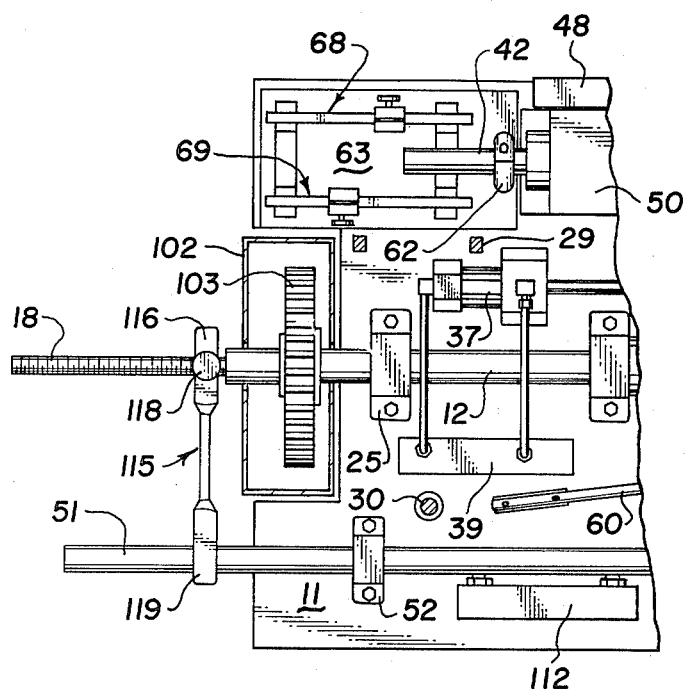
FIG. 11 is a fragmentary top view of the apparatus of FIG. 9, taken in the plane 11—11 of FIG. 9 to eliminate the showing of the gear box and drive motor.

This long thread mode of operation of the apparatus may also be used to cut a full length of thread on a rod 18, where means is provided for clamping the rod at the front end of the machine, to enable the cutting of the last increment of threads on the rear end of the rod which is then released from the chuck 44. For this operation the length of the rod to be threaded must be greater than the combined length of the spindle 12 and cutting head 35. FIGS. 11 and 12 illustrate a form of clamp 115 which coacts with a forward extension of the support rail 51 to prevent rotation of the rod for the cutting of this last increment of threads. As best seen in FIG. 12 this clamp comprises an elongated arm having a head 116 at one end, which head is provided with a transverse bore containing a C-shaped bushing 117 fabricated from bronze or other suitable material to enable clamping of the threaded rod without damage to the threads. The bushing 117 is disposed within the bore to enable compressing of the bushing on the rod by the turning of a compression screw 118 having a suitable hex head. A fork 119 is formed at the other end of the clamp arm, to loosely receive the support rail 51 and to allow longitudinal movement of the clamp 115 along with the rod 18 relative to the support rail. As seen, this clamp 115 will prevent rotation of the rod in either direction so that it will function for the cutting of either right hand or left hand threads. At the completion of the threading operation the clamp and rod are withdrawn from the forward end of the spindle 12, and the clamp 115 is removed.

Another improved feature of the apparatus is concerned with the preventing of rotation of the carriage in either direction, relative to the support shaft 42 and ball bushing 50, to accomodate the cutting of either right hand or left hand threads. For this purpose the carriage frame 41 is supported relative to the support rail 51 by means of upper and lower rollers 46a and 46b respectively. In order to provide for precise height adjustment of the carriage 14 and its associated chuck 44, relative to the spindle 12, each of the rollers 46a and 46b is mounted on an eccentric journal 121 secured to the carriage frame by means of a suitable cap screw 122 for example. By appropriate adjustment of the eccentric journals 121, the positions of the rollers are adjusted to fix the height of the carriage relative to the frame and to minimize any rotational backlash of the carriage. The bottom roller 46b prevents rotation of the carriage during the cutting of left hand external threads on the rod, and also during the withdrawal of a right hand tap from a rod after completion of the tapping operation.

A control circuit for this modified form of apparatus 100 is illustrated in FIG. 13. This circuit is generally similar to the circuit of FIG. 8 but includes some additional components to control the additional described functions. A three position selector switch 93 functions as an on-off switch and also selects between the reversing mode (RM) and the opening die mode (ODM). A selector switch 94 is provided to select between use of alternating forward limit swiches 66 and 67 (ALT) or of the No. 1 limit switch 66 only (No. 1). A selector switch 95 provides for selection between standard mode (STD) where the threading cycle includes a single feed stroke of the carriage and a long thread mode (LONG) wherein a threading cycle includes successive feed strokes of the carriage, for cutting successive increments of threads. An additional relay RM functions to control the circuit for the reversing mode; and an open chuck relay OC functions in the long thread mode to hold the chuck open when the carriage is retracted for a succeeding feed stroke. Valve solenoids 112-1 and 112-2 and push button switch are provided for control of the power assist 105.

OPERATION OF EMBODIMENT OF FIGS. 9 through 13

For the reversing mode of operation, the selector switch 93 is placed in the RM position; and this closes contacts 93-1, 93-2 and 93-3. Contacts 93-1 energize the circuit. Contacts 93-2 energize relay RM. Contacts 93-3 place the No. 1 forward limit switch 66 continuously in the circuit. The position of selector switch 94 is immaterial. The selector switch 95 is placed in the indicated STD position. Contacts RM-2 and RM-3 are opened to remove relay TD and the valve solenoids 39-1 and 39-2 from the circuit. Contacts RM-4 are closed and contacts RM-5 are opened to effect reversal of the motor through the bistable relay contacts BS-3 and BS-4. At the start of the cycle contacts BS-3 are closed to energize the motor forward relay F and effect motor drive in the forward direction.

A rod 18 is inserted in the chuck as described, and with initial forward movement of the carriage switch contacts 64-1 are closed to energize the close chuck solenoid 48-1. At the end of the cutting stroke, limit switch 66 is closed, bistable relay BS is energized through contacts RM-1, and opens contacts BS-3 and closes contacts BS-4 to energize the reverse relay R of the motor and effect reverse drive. This effects the backing off of the threading head (tap or die), to release the rod from the head and permit retraction of the carriage. When the carriage reaches the rear limit position, switch contacts 64-1 open to open the chuck, and switch contacts 64-2 close to energize bistable relay BS and reverse the contacts BS-3 and BS-4 to again effect drive of the motor in the forward direction. The rod is removed and the apparatus is ready for a succeeding cycle.

For the open die mode of operation, the selector switch 93 is placed in the ODM position to energize the circuit through contacts 93-1. Selector switch 94 is placed in the indicated ALT position to provide for alternating connection of the forward limit switches 66 and 67 through the respective contacts BS-1 and BS-2. (If it were desired only to use the No. 1 limit switch 66, then the switch would be placed in the No. 1 position.) Selector switch 95 is placed in the STD position. Contacts RM-5 are closed to energize the motor forward relay F, and the motor operates continuously in one direction. The self-opening die is closed at the beginning of the cycle.

The first end of the rod is placed in the chuck, and with initial forward movement of the carriage switch contacts 64-1 effect the closing of the chuck. At the completion of the cutting stroke, limit switch 66 is closed, and energizes open die solenoid 39-2 to effect the opening of the die. With the retraction of the carriage by pulling on the rod 18, switch contacts 64-1 are opened to deenergize solenoid 48-1 to open the chuck and release the rod; and switch contacts 64-2 are closed to energize relay BS effecting reversal of the contacts BS-1 and BS-2 to remove limit switch 66 from the circuit and place limit switch 67 in circuit. Closing contacts 64-2 also energizes solenoid 39-1 to close the die, and energize relay TD which opens contacts TD-1 after a time delay. The other end of the rod is then inserted into the chuck and initial forward movement opens switch contacts 64-2 to deenergize relay TD, and closes switch contacts 64-1 to close the chuck. At the completion of the second thread cutting, limit switch 67 is closed to open the die through solenoid 39-2. Upon return of the carriage, switch contacts 64-1 again effect opening of the chuck, contacts 64-2 energize relay BS to again reverse the contacts BS-1 and BS-2 and replace limit switch 66 in circuit, and contacts 64-2 again energize solenoid 39-1 to close the die. The rod is removed and the apparatus is conditioned for a succeeding double thread cutting cycle.

For the long thread cycle of operation the selector switch 93 is placed in the ODM position, to energize the circuit. The position of selector switch 94 is immaterial. Selector switch 95 is placed in the LONG position, to close contacts 95-1 and 95-2 and open contacts 95-3. Limit switch 66 is continuously in circuit through contacts 95-1. Contacts RM-5 are closed to effect continuous forward drive of the motor. A rod 18 is inserted in the chuck 44 to begin a multi-increment threading cycle. The self-opening die is closed at the beginning of the cycle.

The following steps are repeated for each threading increment. Initial forward movement of the carriage closes contacts 64-1 to close the chuck. At the completion of the cutting increment, limit switch 66 is closed and energizes relay OC through contacts 95-2. Relay contacts OC-1 are opened to deenergize chuck solenoid 48-1 and open the chuck. Relay contacts OC-2 are closed to hold relay OC energized through switch contact 64-1. This allows the carriage to be withdrawn relative to the rod which is held by, and continues to rotate with the cutting die. The carriage is then returned to the rear limit position, opening switch contacts 64-1 to deenergize relay OC and effect closing of contacts OC-1. The immediately following forward carriage movement again closes contacts 64-1 to effect the closing of the chuck for the next cutting increment cycle.

These cutting increment cycles are repeated for as many cycles as desired, excluding the last increment cycle. For the last increment cycle, either prior to or immediately after initiating forward feed of the carriage to close the chuck, the selector switch 95 is shifted to the STD position. Then, at the completion of this last increment cut, limit switch 66 is closed to open the die through solenoid 39-2 (the chuck remains closed) permitting withdrawal of the carriage and rod. Upon return of the carriage to the rear limit position, contacts 64-1 effect the opening of the chuck to release the rod, and contacts 64-2 effect the closing of the die. The selector switch 95 must then be returned to the LONG position for a succeeding long thread cutting cycle.

The cutting of a full length thread on a rod is a variation of the long thread mode of operation. For this operation the selector switch 93 is positioned in the ODM position; and the selector switch 95 is positioned in and remains in the LONG position. The thread will be cut in as many increments as is required, employing the maximum stroke of the carriage to cut the full length of thread. After the second-to-last feed stroke, when the carriage is returned to the rear limit position the chuck 44 will withdraw from the trailing end of the rod. At this point the selector switch 93 is shifted to the off position, to deenergize the circuit and stop rotation of the drive motor. The clamp 115 is then placed in position on the rod 18 and the support rail 51, adjacent to the front end of the spindle 12. The apparatus is then restarted by placing the selector switch 93 in the ODM position; and the trailing increment of threads will be cut with the rod passing through the cutters of the die head within the spindle. The rod 18 and clamp 115 are then removed from the apparatus; and the apparatus is ready for a succeeding full thread cycle.

The power assist 105 may be used at any time, in connection with any of the above described operating modes. To activate the power assist, push button switch 113 is closed to energize solenoid 112-1 thereby actuating the air cylinder motor 106 to draw the carriage toward the threading head. When the air cylinder hook 109 reaches its forward limit, and the thread cutting progresses with continued forward movement of the carriage. Return of the power assist hook is effected when the solenoid 112-2 is energized by either of the forward limit switches 66 or 67; and this effects unimpeded return of the carriage to the rear limit position.

FEATURES AND ADVANTAGES

What has been described is apparatus which is particularly suited for the economic fabrication of threads on the ends of rods. The apparatus is compact and portable in the sense that it can be readily moved from one location to another in a plant or shop, and can be very quickly set up for immediate operation. The preferred form of apparatus requires only electrical and compressed air hookup, which utilities are conveniently available in many locations of a plant or a shop.

Another very important feature and advantage of the apparatus is that it is very simple to use and is semi-automatic and generally foolproof in operation, so that the operation can be mastered by semi-skilled personnel and the losses due to scrap will be minimum.

A particular feature of the apparatus is that it can be set up very readily for a two thread cycle, wherein different lengths of thread can be threaded sequentially on the opposite ends of a rod. The control circuit includes a selector switch for selecting between a "two thread cycle" or a "one thread cycle".

Another important feature of the apparatus is that it embodies a self-closing and opening collet chuck which is automatically operated by movement of the carriage, and may embody a self-opening die head which is also automatically operated by movement of the carriage. With the controls described, the length of thread to be cut can be controlled very precisely. An ancillary feature of the control circuit is that it can be readily switched between operation with a fixed threading head or tap and operation with a self-opening die.

Another feature of the apparatus is that it enables use of a self-opening die head for cutting external threads, and embodies a die head control mechanism which only acts on the die head to effect the shifting between open and closed positions and minimizes wear on such die head which is an expensive component.

Another important feature of the apparatus is that the carriage is very free moving, thereby minimizing any strain on the threading head when the rod is engaged with the threading head and allowing the rod to follow the threading head very accurately. An ancillary advantage is that the carriage is moved both forward to engage the rod with the threading head and returned to the rear limit position merely by the operator grasping the rod with one hand. This minimizes the necessary movement by the operator.

Another important feature of the apparatus is the capability of cutting extra long threads by cutting the threads in successive increments, employing successive feed strokes of the carriage. A related important feature is the ability of the apparatus for cutting a full length thread on a rod, or an all thread rod.

Still another feature of the apparatus is its ability to cut external threads, particularly on relatively large diameter rods, through the use of a power feed assist to aid in the start of the thread cutting cycle.

Additional capabilities of the apparatus are that it may be used for threading of U-bolts having legs as short as 7 inches and spaced apart less than 2 inches for example, and it may also be adapted for threading the entire length of a rod which can pass through the threading head and the hollow drive spindle which carries the threading head.

While preferred embodiments of the invention have been illustrated and described, it will be understood by those skilled in the art that changes and modifications may be resorted to without departing from the spirit and scope of the invention.

What is claimed is:

1. Threading apparatus comprising
   a support base;
   a drive spindle mounted for rotation on said base; a threading head nonrotatably mounted on said drive spindle in axial alignment therewith; drive means for rotating said drive spindle in at least one direction;
   a carriage mounted on said base for free forward and rearward reciprocating movement in a direction parallel to the rotational axis of said threading head; stop means for limiting the rearward movement of said carriage away from said threading head, and defining a rear limit position for said carriage;
   a collet chuck mounted on said carriage, disposed in axial alignment with said threading head, for rigidly clamping a work rod; said carriage and said collet chuck being configured to enable the work rod to be passed through said chuck;
   substantially frictionless support means supporting said carriage for said reciprocating movement, to enable said carriage and clamped work rod to follow freely the lead of said threading head during engagement thereof with the work rod;
   a movable rod stop supported on said carriage; said rod stop having a normal interference position to limit forward movement of a rod inserted in said collet chuck;
   means, responsive to movement of said carriage away from said rear limit position, for moving said rod stop out of said interference position;
   actuator means, mounted on said base, for controlling selected functions of a threading cycle of said apparatus including the opening and closing of said collet chuck and the operation of said threading head; trip means mounted on said carriage for activating said actuator means in response to selected movements of said carriage relative to said base.

2. Threading apparatus as set forth in claim 1
   said trip means including means for activating said actuator means to open said chuck when said carriage moves to said rear limit position, and means for activating said actuator means to close said chuck when said carriage moves initially away from said rear limit position.

3. Threading apparatus as set forth in claim 1
   said means for moving said rod stop comprising cam means mounted on said support base, disposed to effect said movement of said rod stop when said carriage is moved away from said rear limit position.

4. Threading apparatus as set forth in claim 3
   said rod stop comprising an elongated arm pivotally mounted on said carriage;
   said cam means for engaging said rod stop comprising a member defining a cam surface inclined relative to a swing axis of said rod stop arm; said cam surface effecting rotation of said rod stop arm relative to its swing arm, to rotate said arm out of said interference position.

5. Threading apparatus as set forth in claim 1
   said threading head comprising a self-opening die head;
   said actuator means comprising means for effecting the opening and closing of said self-opening die head; and said trip means including means for activating said actuator means to open and close said self-opening die head in response to selected movements of said carriage.

6. Threading apparatus as set forth in claim 1
   said drive means comprising means for rotating said drive spindle in two directions; said actuator means comprising means for effecting the reversal of rotation of said drive means;
   said trip means including means for activating said actuator means to effect reversal of said drive means between said two directions of rotation in response to selected movements of said carriage.

7. Threading apparatus as set forth in claim 1
   said carriage including a guide shaft aligned parallel with said collet chuck;
   support means for said carriage comprising a linear ball bushing mounted on said base, with its axis aligned parallel to the axis of said spindle and threading head, for supporting and guiding said carriage guide shaft;
said linear ball bushing and said guide shaft comprising the principal support for said carriage.

8. Threading apparatus as set forth in claim 7
said support means for said carriage further comprising a support rail mounted on said base in parallel spaced relation to said linear ball bushing, and at least one roller mounted on said carriage for rolling engagement with said support rail.

9. Threading apparatus as set forth in claim 8
said support rail having recess means disposed to coact with said roller, when said carriage is in said rear limit position, to restrain initial movement of said carriage away from said rear limit position.

10. Threading apparatus as set forth in claim 1
said support base comprising a pan defining a reservoir for cooling liquid.

11. Apparatus as set forth in claim 1
said carriage comprising an elongated transverse frame member, an elongated guide shaft mounted on said frame member adjacent to one end and extending perpendicular thereto, and a support roller mounted on said frame adjacent to its other end;
support means for said carriage comprising a linear ball bushing and a support rail; said linear ball bushing being mounted on said base at one side of said spindle and coacting with said guide shaft, with the bushing axis aligned parallel to the spindle axis; said support rail being mounted on said base at the other side of said spindle for coaction with said support roller, with the support rail disposed parallel to the spindle axis.

12. Threading apparatus as set forth in claim 1
said drive spindle being hollow and dimensioned to permit the passage therethrough of a rod to be threaded.

13. Threading apparatus as set forth in claim 1
means providing restraint to initial movement of said carriage away from said rear limit position.

14. Threading apparatus as set forth in claim 1
said actuator means comprising: a first actuator means operated in response to arrival of said carriage at said rear limit position; a second actuator means operated in response to initial movement of said carriage away from said rear limit position; and a third actuator means operated in response to movement of said carriage to a first forward limit position.

15. Threading apparatus as set forth in claim 14
said third actuator means comprising a control member mounted on said base biased to a first condition, and an actuator member pivotally mounted on said base for actuating said control member to a second condition;
said trip means comprising a shaft projecting from said carriage having its axis aligned parallel with the axis of said threading head and said spindle, and carrying a trip cam;
said actuator member including an elongated bar disposed parallel to and alongside said trip shaft, and an adjustable follower cam mounted on said bar; said bar having indicia means for identifying desired locations of said follower cam relative to said operator bar; and said follower cam being disposed for engagement by said trip cam to pivot said actuator member.

16. Threading apparatus as set forth in claim 14
said threading head comprising a non-opening threading die or tap; said drive means for said drive spindle comprising a reversible drive;
said first actuator means opening said chuck, and reversing the rotation of said threading head to effect the threading of a work rod engaging said head; said second actuator means closing said chuck; said third actuator means reversing the rotation of said threading head to back off the threading head from the work rod.

17. Threading apparatus as set forth in claim 14
said threading head comprising a self-opening die head;
said first actuator means opening said chuck, and closing said threading head to effect the threading of a rod engaging said head;
said second actuator means closing said chuck;
said third actuator means opening said head to free the work rod.

18. Threading apparatus as set forth in claim 17
said actuator means further comprising: a fourth actuator means operated in response to movement of said carriage to a second forward limit position, spaced from said first forward limit position;
said fourth actuator means opening said head to free the work rod;
and control means for effecting, alternatively, the operation of said third and fourth actuator means.

19. Threading apparatus as set forth in claim 18
said trip means comprising a shaft extending from said carriage with its axis aligned parallel to the axis of said threading head and said spindle, and carrying a trip cam;
each of said third and fourth actuator means comprising a control member mounted on said support base, biased to a first condition, and an actuator member pivotally mounted on said base for actuating said control member to a second condition;
each of said actuator members including an elongated bar disposed parallel to the path of said shaft and adjacent to that path, an adjustable follower cam mounted on said bar and disposed to be engaged by said trip cam to pivot said actuator member, and indicia means on said bar for identifying desired longitudinal positions of said follower.

20. Threading apparatus as set forth in claim 14
said thread head comprising a closed die head driven in a single direction of rotation;
said second actuator means closing said chuck;
and said third actuator means opening said chuck to allow the work rod to rotate with said head.

21. Threading apparatus as set forth in claim 20
said threading head comprising a self-opening die head;
control means for shifting the operation of said actuator means between a first operating mode and a second operating mode;
in said first operating mode: said second actuator means closing said chuck; and said third actuator means opening said chuck to allow said rod to rotate with said head;
in said second operating mode said first actuator means opening said chuck; said second actuator means closing said chuck; and said third actuator means opening said head to allow withdrawal of said rod from said head.

22. Threading apparatus as set forth in claim 1 power assist means for said carriage comprising an extensible air cylinder motor and associated actuator rod mounted on said base, parallel to said spindle; said air cylinder actuator rod having hook means mounted on the distal end thereof; catch means mounted on said carriage for engagement by said hook means to urge said carriage into engagement with said threading head.

23. Threading apparatus as set forth in claim 8 a pair of rollers mounted on said carriage about parallel axes, for rolling engagement with said support rail on opposite sides thereof;

said rollers being mounted on eccentric journals, for adjusting the position of said carriage relative to said support rail.

24. Threading apparatus comprising a support base;

a drive spindle mounted for rotation on said base; a threading head nonrotatably mounted on said drive spindle in axial alignment therewith; drive means for rotating said drive spindle in at least one direction;

a carriage mounted on said base for free forward and rearward reciprocating movement in a direction parallel to the rotational axis of said threading head; stop means for limiting the rearward movement of said carriage away from said threading head, and defining a rear limit position for said carriage;

a collet chuck mounted on said carriage, disposed in axial alignment with said threading head, for rigidly clamping a work rod; said carriage and said collet chuck being configured to enable the work rod to be passed through said chuck;

substantially frictionless support means supporting said carriage for said reciprocating movement, to enable said carriage and clamped work rod to follow freely the lead of said threading head during engagement thereof with the work rod;

actuator means, mounted on said base, for controlling selected functions of a threading cycle of said apparatus including the opening and closing of said collet chuck and the operation of said threading head; trip means mounted on said carriage for activating said actuator means in response to selected movements of said carriage relative to said base;

said carriage including a guide shaft aligned parallel with said collet chuck;

support means for said carriage comprising a linear ball bushing mounted on said base, with its axis aligned parallel to the axis of said spindle and threading head, for supporting and guiding said carriage guide shaft;

said linear ball bushing and said guide shaft comprising the principal support for said carriage;

said trip means comprising a trip cam mounted on said guide shaft.

25. Threading apparatus comprising a support base;

a drive spindle mounted for rotation on said base; a threading head nonrotatably mounted on said drive spindle in axial alignment therewith; drive means for rotating said drive spindle in at least one direction;

a carriage mounted on said base for free forward and rearward reciprocating movement in a direction parallel to the rotational axis of said threading head; stop means for limiting the rearward movement of said carriage away from said threading head, and defining a rear limit position for said carriage;

a collet chuck mounted on said carriage, disposed in axial alignment with said threading head, for rigidly clamping a work rod; said carriage and said collet chuck being configured to enable the work rod to be passed through said chuck;

substantially frictionless support means supporting said carriage for said reciprocating movement, to enable said carriage and clamped work rod to follow freely the lead of said threading head during engagement thereof with the work rod;

actuator means, mounted on said base, for controlling selected functions of a threading cycle of said apparatus including the opening and closing of said collet chuck and the operation of said threading head; trip means mounted on said carriage for activating said actuator means in response to selected movements of said carriage relative to said base;

said drive spindle being hollow and dimensioned to permit the passage therethrough of a rod to be threaded;

a clamp for clamping attachment to the forward end of a work rod extending from the forward end of said spindle; and means on said base coacting with said clamp to prevent rotation thereof relative to said spindle, while permitting axial movement thereof relative to said spindle.

26. Threading apparatus comprising a support base;

a drive spindle mounted for rotation on said base, a threading head nonrotatably mounted on said drive spindle in axial alignment therewith; drive means for rotating said drive spindle in at least one direction;

a carriage mounted on said base for free forward and rearward reciprocating movement in a direction parallel to the rotational axis of said threading head; stop means for limiting the rearward movement of said carriage away from said threading head, and defining a rear limit position for said carriage;

a collet chuck mounted on said carriage, disposed in axial alignment with said threading head, for rigidly clamping a work rod; said carriage and said collet chuck being configured to enable the work rod to be passed through said chuck;

substantially frictionless support means supporting said carriage for said reciprocating movement, to enable said carriage and clamped work rod to follow freely the lead of said threading head during engagement thereof with the work rod;

actuator means, mounted on said base, for controlling selected functions of a threading cycle of said apparatus including the opening and closing of said collet chuck and the operation of said threading head; trip means mounted on said carriage for activating said actuator means in response to selected movements of said carriage relative to said base;

said drive spindle being hollow and dimensioned to permit the passage therethrough of a rod;

said base including a shaft projecting forwardly relative to the forward end of said spindle and parallel with said spindle;

an elongated clamp arm having means at one end for clamping attachment to the forward end of a work rod projecting from the forward end of said spindle, and extending transversely from said work rod; and said clamp arm having a yoke at its other end configured to receive said projecting shaft, thereby preventing rotation of said clamp arm and work rod while permitting axial movement thereof.

* * * * *